United States Patent Office 3,830,939
Patented Aug. 20, 1974

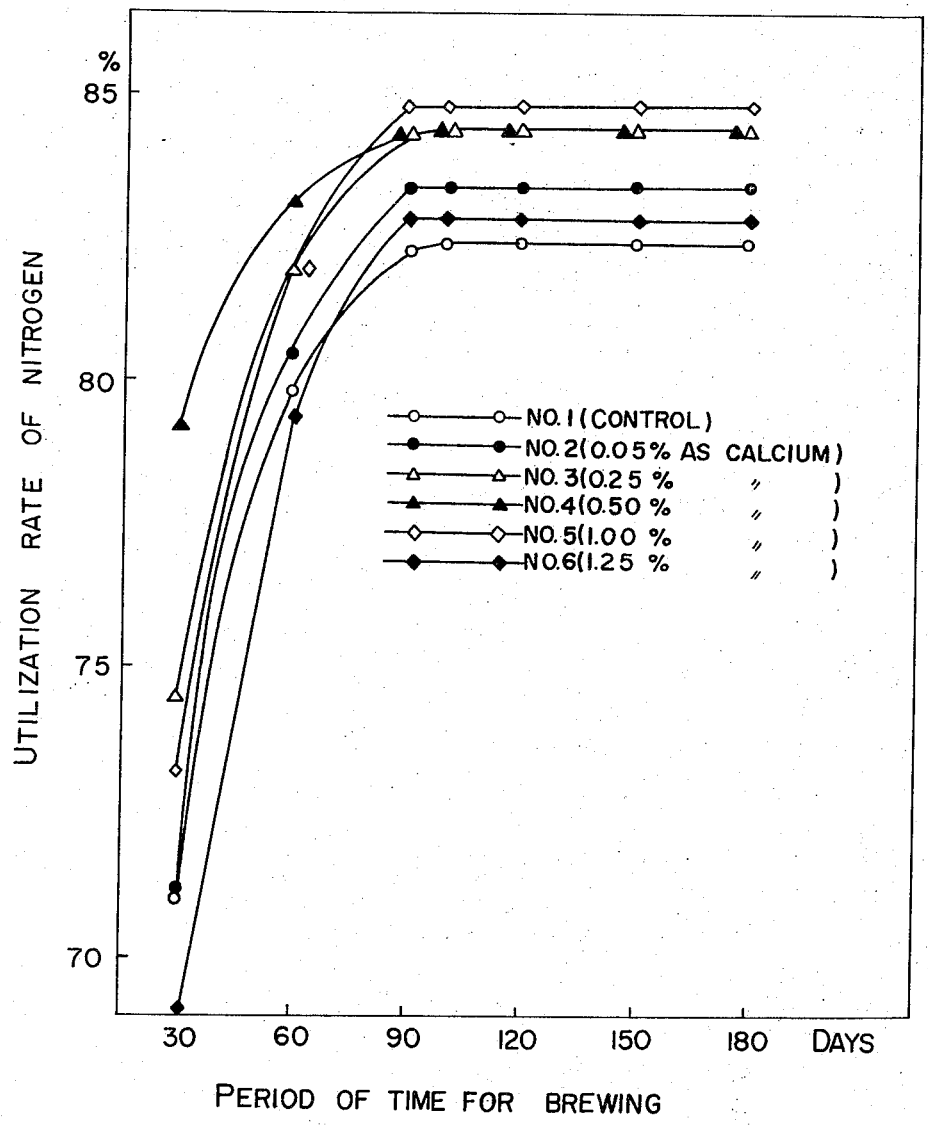

3,830,939
PROCESS FOR PRODUCING SOY SAUCES
Toshio Sakasai, and Katsumi Yuasa, Noda, Japan, assignors to Kikkoman Shoyu Co., Ltd., Noda, Japan
Filed Aug. 25, 1972, Ser. No. 283,668
Claims priority, application Japan, Aug. 28, 1971,
46/65,577
Int. Cl. A23l 1/20
U.S. Cl. 426—46          9 Claims

ABSTRACT OF THE DISCLOSURE

A soy sauce is produced by subjecting a protein-containing starting material to steaming treatment in the presence of 0.05 to 1.0% by weight, based on the weight of the starting material, of a calcium salt in terms of calcium, whereby not only the utilization ratio of protein in said starting material is increased but also the period of time required for the production of soy sauce can be shorter than in the conventional process.

---

This invention relates to a process for producing a soy sauce. More particularly, the invention pertains to a process for producing a soy sauce from a protein-containing starting material which makes it possible to attain a high utilization ratio of protein contained in the starting material.

Soy sauces are excellent seasonings, and the quantities thereof consumed show a yearly increase. Processes for producing soy sauces have already been well known. Generally, soy sauces are produced in the manner described below.

A soy sauce koji mold (spores of aspergillus) is inoculated into a mixture comprising a vegetable protein-containing starting material which has been subjected to steaming treatment and a carbohydrate-containing starting material which has been roasted and crushed, and is then cultured according to an ordinary procedure to obtain a solid koji. Subsequently, the solid koji is fed to a fermentation tank together with an aqueous sodium chloride solution and then aged under suitable conditions, whereby fermentation is effected by action of the microorganism to give a so-called aged moromi (mash) (unrefined soy). This moromi is freed from solids to obtain a soy sauce. Ordinarily, a period of time of 4 to 18 months is required for the production of soy sauce.

Literature materials concerning the production of soy sauces are as follows:

(1) Klare S. Markley: Soybeans and Soybean Products, Vol. II. 993–994 (1951), Interscience Publishers Inc., New York.
(2) Thomas E. Furia: CRC Critical Reviews in Food Technology, 40 (1971), The Chemical Rubber Co.
(3) Isao Umeda: Shoyu, (1963), Sankyo Shuppan K.K., Japan.

In the production of soy sauce, the utilization ratio of protein in the starting material is an extremely important factor relating to the reduction in cost of the resulting soy sauce. In order to increase said utilization ratio, various examinations have heretofore been made with respect to the amount of water sprayed, the temperature, the time and the like conditions adopted in the steaming treatment of protein-containing starting material. The results of said examinations, however, have not always been satisfactory.

As to the steaming treatment of protein-containing starting material for soy sauce, the present inventors made extensive studies from another standpoint than such steaming conditions as mentioned above to find that when the protein-containing starting material is subjected to steaming in the presence of a calcium salt, the utilization ratio of protein in the starting material, i.e. nitrogen utilization ratio, can be increased to a higher extent. Based on the above finding, the inventors have accomplished the present invention.

An object of the present invention is to provide a process for producing soy sauces which is high in utilization ratio of protein.

Another object of the invention is to provide a process for producing soy sauces which require a short period of time for the production of soy sauces.

The above objects of the present invention can be accomplished by subjecting a protein-containing starting materal for soy sauce to steaming treatment in the presence of 0.05 to 1.0% (w./w.) of a calcium salt in terms of calcium.

The increase of nitrogen utilization ratio improves the productivity, the apparatus working ratio and the profit ratio to greatly contribute to the reduction in cost of the resulting soy sauce. Accordingly, how to increase the nitrogen utilization ratio has been the greatest subject matter of inquiry of those skilled in the art of this field, as mentioned previously.

In the production of soy sauce, the significance of increasing the nitrogen utilization ratio by 1% is markedly great. When the process of the present invention is adopted, the nitrogen utilization ratio can be increased by 2% or more as compared with that attained in the conventional process. According to the process of the present invention, the nitrogen utilization ratio can be quickly increased. In the present invention, therefore, a protein-containing starting material treated by the present process is used and the management of fermentation of the resulting soy sauce moromi is accurately effected, whereby a soy sauce comparable to that obtained according to the conventional process can be produced within about 2 months after feeding of the starting material.

The present invention is explained in detail below.

As protein-containing starting materials for the production of soy sauces, there have been used various materials such as soybeans [defatted soybean: crude protein content 40–50% (w./w.); untreated soybean: crude protein content 30–40% (w./w.)], glutens [wheat gluten: crude protein content 65–75% (w./w.); corn gluten: crude protein content 60–70% (w./w.)], etc. The present process is successfully applicable to all these protein-containing starting materials for soy sauces. These starting materials may be used in any form such as soybeans themselves, flakes, flours or meals. As the carbohydrate-containing starting materials used in the present process, there are employed wheat, wheat bran, rice and barley. These may be used any of such forms as flours or meals.

The calcium salt used in the present invention may be any calcium salt of an organic or inorganic acid, but is required to be soluble in water and harmless from the standpoint of food sanitation. Examples of the calcium salt include calcium citrate, calcium tartarate, calcium lactate, calcium succinate, calcium gluconate, calcium carbonate, calcium sulfate and calcium chloride. The calcium salts may be used singly or in combination. Among these, calcium carbonate and calcium chloride are particularly preferable.

It is extremely important that the amount of calcium salt added is made 0.05 to 1.0% by weight, preferably 0.25 to 1.0% by weight in terms of calcium, based on the weight of the protein-containing starting material (which ordinarily contains 9 to 13% by weight of water). In case the amount of calcium salt added is less than 0.05% in terms of calcium, the increase of nitrogen utilization ratio is extremely slight, while in case the said amount is more than 1% in terms of calcium, the nitrogen utilization ratio is increased to a considerable extent but the resulting soy sauce is undesirably deteriorated in taste and flavor.

The calcium salt may be added either before or during the steaming treatment of the protein-containing starting material. If the calcium salt is added after steaming treatment, the objects of the present invention cannot be accomplished. This is considered ascribable to the point that when the protein-containing starting material is subjected to steaming treatment in the presence of calcium, the protein is denatured to an extremely high degree, whereby the hydrolysis of the protein by means of proteinase is markedly facilitated to increase the nitrogen utilization ratio to a great extent.

The manner of addition of the calcium salt is suitably selected so that said calcium salt can be applied to the protein-containing starting material as uniformly as possible. For example, in case the calcium salt is to be added to defatted soybean or gluten, a predetermined amount of the calcium salt is dissolved in water and the resulting aqueous solution is used as spraying water, or in case the calcium salt is to be applied to untreated soybean, the soybean is immersed in water and drained, and then a predetermined amount of the calcium salt is sprinkled over and mixed with the soybean, whereby the calcium salt can be easily applied uniformly to the starting material.

Conditions to be employed in practicing the present process, e.g. the amount of spraying water, and the pressure of saturated steam (i.e. the steaming temperature), the steaming time and the like steaming conditions, are not particularly limited, and any of such procedures as explained below can be successfully adopted.

For example, in case defatted soybean or gluten is desired to be subjected to steaming treatment, 1.2 to 1.4 parts by weight, per part by weight of the starting material, of water is absorbed in the starting material by spraying to soften the starting material. Subsequently, when required, steam is uniformly applied to the starting material at atmospheric pressure for a suitable period of time (ordinarily for 30 to 40 minutes). Thereafter, the thus treated material is steamed with saturated steam under a pressure of not less than 0.8 kg./cm.$^2$ (gauge) (steaming temperature not less than 116° C.) for 80 minutes or less (ordinary conditions are a saturated steam pressure of 1 kg./cm.$^2$ (gauge) for about 40 minutes, 3 kg./cm.$^2$ (gauge) for about 4 minutes and 6 kg./cm. (gauge) for about 1 minute), and is then cooled. Alternatively, in case untreated soybean is desired to be subjected to steaming treatment, the soybean is ordinarily swelled by immersing the same in water at 10° to 20° C. for about 16 hours and is then subjected, without spraying water thereto, to the same steaming treatment as in the case of the defatted soybean.

In the present invention. the production of soy sauce is carried out according to a process which is well known in the soy sauce brewing field, except that the protein-containing starting material is subjected in the aforesaid manner to steaming treatment in the presence of a calcium salt. That is, a protein-containing starting material, which has been steamed according to the present process and cooled by use of such a pressure-reducing means as a jet condenser or vacuum pump, is mixed with a carbohydrate-containing starting material which has been roasted at about 50–220° C., cooled by customary method and crushed at about 30–50° C. Subsequently, a soy sauce koji mold is inoculated into the resulting mixture and cultured at 23° to 40° C. for 40 to 90 hours to obtain a solid koji. The thus obtained solid koji is mixed with an aqueous sodium chloride solution, and then fermented and aged at 20° to 40° C. ordinarily for 4 to 18 months, whereby an aged moromi is obtained. During the said period, the moromi is properly stirred.

During the period of the above-mentioned fermentation and aging, the protein and carbohydrate in the solid koji are hydrolyzed with a hydrolase possessed by the koji and is fermented by the action of a microorganism peculiar to the brewing field or of a separately added soy sauce lactic acid mold or soy sauce yeast. The moromi thus fermented and aged is compressed by means of, for example, a hydraulic machine, and is separated into a raw soy sauce and a soy sauce cake, and the raw soy sauce is pasteurized to obtain a refined soy sauce.

The present invention is illustrated in more detail below with reference to examples, but it is needless to say that the invention is not limited to the examples.

EXAMPLE 1

Calcium chloride $(CaCl_2 \cdot 2H_2O)$ in each of such amounts as shown in Table 1 was dissolved in 1.3 liters of water. The resulting solution was sprayed in an amount of 130% to 1.0 kg. of defatted soybean. After allowing to stand for about 1 hour, the thus treated defatted soybean was steamed in an autoclave at atmospheric pressure for 30 minutes, and then subjected to steaming treatment with saturated steam under a gauge pressure of 1 kg./cm. for 45 minutes. Subsequently, the pressure was reduced to atmospheric, and the defatted soybean which had been subjected to the steaming treatment was taken out of the autoclave and allowed to cool to 30° to 40° C. The thus treated defatted soybean was sprayed and inoculated with a soy sauce koji mold *Aspergillus sojae* as a seed, and then incorporated with 0.9 kg. of roasted wheat to mix the three with each other. Thereafter, the defatted soybean was charged into a koji-making tray and cultivation was effected at 25° to 35° C. for 56 hours to obtain a solid koji. Each solid koji obtained in the above manner was mixed with 3.6 liters of a 24% (w./v.) aqueous sodium chloride solution, and the resulting mixture was subjected to ordinary moromi management with proper stirring in a thermostat at 3° C. for 100 hours. As the result, soy sauces of such compositions as shown in Table 1 were obtained. Further, the nitrogen utilization ratios in the above-mentioned cases were as summarized in Table 2.

TABLE 1

| No. | Percent (w./w.) | | Percent (w./v.) | | | | | | | Evaluation of flavor and taste |
|---|---|---|---|---|---|---|---|---|---|---|
| | $CaCl_2 \cdot 2H_2O$ | In terms of Ca | NaCl | TN | FN | RS | Alc. | Col. | pH | |
| 1 (Control) | 0 | 0 | 17.7 | 1.74 | 0.98 | 2.53 | 1.84 | 500 | 4.88 | Excellent. |
| 2 | 0.18 | 0.05 | 17.7 | 1.76 | 1.06 | 3.58 | 1.90 | 460 | 4.80 | Do. |
| 3 | 0.92 | 0.25 | 17.7 | 1.78 | 1.10 | 3.69 | 2.00 | 430 | 4.90 | Do. |
| 4 | 1.83 | 0.5 | 17.7 | 1.78 | 1.11 | 4.00 | 1.88 | 400 | 4.93 | Do. |
| 5 | 3.66 | 1.0 | 17.7 | 1.79 | 1.12 | 3.61 | 1.95 | 310 | 4.91 | Do. |
| 6 | 4.59 | 1.25 | 17.7 | 1.75 | 1.01 | 3.84 | 1.89 | 350 | 4.90 | Inferior. |

In Table 1, TN (total nitrogen) was measured according to the Kjeldahl method, FN (formol nitrogen) according to the Formol's method, RS (reducing sugar) according to Bertrand method, and Alc. (alcohol=ethanol) according to the oxidimetry method using potassium bichromate.

FN was composed mainly of amino nitrogen, and contained ammonia nitrogen in addition thereto; and RS was a direct reducing sugar and was composed mainly of glucose, maltose and the like.

Col. (color) was measured according to "Standard Method for Shoyu Analysis" (published by Shoyu Technical Society of Japan on May 15, 1960). When col. 1,000 measured according to the above-mentioned method is represented according to C.I.E. Colorimetric System (Commission Internationale de l'Eclaige) [Gunter Wyszecki & W. S. Stiles: Color Science, 238 (1967) published by John Wiley & Sons Inc., (N.Y.)], values of $x$, $y$ and $Y$ are as follows:

$$x = \frac{X}{Y+X+Z} \text{ (Red) } 0.678$$

$$y = \frac{Y}{X+Y+Z} \text{ (Green) } 0.322$$

$Y$ = Relative transmittance (Luminosity)

When col. 1,000 is represented according to the Munsell color system, Munsell value (Luminosity) is 2.00.

Further, in case col. is 500, each value according to the C.I.E. colorimetric system or Munsell color system is 50% of the above-mentioned value.

The evaluation of flavor and taste was effected by a panel of 20 experts.

TABLE 2

| No. | Nitrogen utilization ratio after— | | | Relative utilization ratio of protein-containing material after 100 days |
|---|---|---|---|---|
| | 30 days (percent) | 60 days (percent) | 100 days (percent) | |
| 1 | 71.0 | 79.8 | 82.3 | 100 |
| 2 | 71.1 | 80.4 | 83.3 | 102 |
| 3 | 74.5 | 81.9 | 84.3 | 103 |
| 4 | 79.2 | 83.1 | 84.3 | 103 |
| 5 | 73.2 | 81.9 | 84.8 | 104 |
| 6 | 68.9 | 79.4 | 82.8 | 101 |

After 90 days after feeding of the starting material, the nitrogen utilization ratios of Nos. 1 to 6 showed substantially constant values.

In Table 2, the nitrogen utilization ratio is the ratio (percent) of the total nitrogen dissolved in the liquid portion of the resulting moromi to the total nitrogen in the starting material; and the relative utilization ratio of protein-containing starting material is a value measured by assuming as 100 the nitrogen utilization ratio of the control composed of only the defatted soybean.

Substantially the same results as above were obtained as well when other calcium salts were used.

Tables 1 and 2 clearly show that when defatted soybean, which has been subjected to steaming treatment in the presence of 0.05 to 1.0% by weight of calcium chloride in terms of calcium, is used as a protein-containing starting material for soy sauce, the resulting soy sauce (100 days after feeding of the starting material) has a 1 to 2.5% increased nitrogen utilization ratio (2 to 4% increased in relative utilization ratio of protein-containing starting material) than the control. Further, the thus obtained soy sauce not only does not differ in flavor and taste from the control but also is light in color and thus is excellent.

The nitrogen utilization ratios shown in Table 2 were graphed to form curves as seen in FIG. 1. From FIG. 1, it is understood that in case the amount of calcium chloride added is preferable, the nitrogen utilization ratio is substantially identical with or far greater than that of the control (No. 1). In such case, therefore, the management of fermentation of soy sauce moromi is effected accurately, whereby a soy sauce well comparable to that obtained according to the conventional process can be produced within about 2 months after feeding of the starting material.

EXAMPLE 2

To 100 kg. of defatted soybean was added 2 kg. (0.8% by weight in terms of calcium based on the weight of the defatted soybean) of calcium carbonate ($CaCO_3$ according to the Japanese pharmacopoeia). This defatted soybean was sprayed with 130 liters of water and then allowed to stand for about 1 hour. Subsequently, the defatted soybean was charged into a rotary pressure steaming kettle, steamed at atmospheric pressure for 30 minutes and under 1 kg./cm.$^2$ (gauge pressure of saturated steam) for 40 minutes, and then cooled to about 40° C. by means of a jet condenser (reduced pressure cooling). The defatted soybean thus treated was mixed in a kettle with 90 kg. of roasted wheat and the mixing of the two was made complete while spraying a seed koji mold thereto. Thereafter, the defatted soybean was charged into a koji-making chamber and subjected to koji-making at 25° C. for 50 hours under aerobic conditions to obtain a solid koji. The thus obtained koji was fed to a fermentation tank together with 130 liters of a 24% (w./v.) aqueous sodium chloride solution, and the resulting moromi was fermented and aged according to an ordinary procedure at 25° to 40° C. for 4 months to obtain 480 liters of a soy sauce which was excellent in flavor and taste and light in color.

Analysis values of the soy sauce components were as follows:

Bé. 23.6, NaCl 17.6% (w./v.), TN 1.77% (w./v.), FN 0.97% (w./v.), RS 5.26% (w./v.), Alc. 2.37% (v./v.), Col. 340, pH 4.84, nitrogen utilization ratio 84.5%.

For comparison, a control soy sauce was produced in the same manner as above, except that the calcium carbonate was not added. The nitrogen utilization ratio of the control soy sauce was 83.3%.

EXAMPLE 3

In a rotary pressure steaming kettle, 120 kg. of untreated soybean was immersed overnight in water and then drained. After 1 hour, the soybean was sprayed with 1.78 kg. (0.4% by weight in terms of calcium) of calcium chloride (special grade, $CaCl_2 \cdot 2H_2O$), and the rotated for 30 minutes. Subsequently, the soybean was allowed to stand for 1 hour, and then steamed at atmospheric pressure for 30 minutes and under 1 kg./cm.$^2$ (gauge pressure of saturated steam) for 60 minutes, thereafter a solid koji was obtained in the same manner as in Example 2. This solid koji was treated in the same manner as in Example 2 for 3 months to obtain 460 liters of a soy sauce which was excellent in flavor and taste and light in color.

Analysis values of the soy sauce components were as follows: Bé. 22.0, NaCl 17.2% (w./v.), TN 1.68% (w./v.), FN 0.85% (w./v.), RS 3.50% (w./v.), Alc. 3.20% (v./v.), Col. 400, pH 4.80, nitrogen utilization ratio 85.8%.

For comparison, a control soy sauce was produced in the same manner as above, except that the calcium chloride was not added. The nitrogen utilization ratio of the control soy sauce was 84.2%.

EXAMPLE 4

1,000 kilograms of defatted soybean meal was sprayed with a solution of 60 kg. (1% by weight in terms of calcium) of calcium lactate (special grade,

$Ca[CH_3 \cdot CH(OH)COO]_2 \cdot 5H_2O$)

in 1,300 liters of water, and then allowed to stand for 40 minutes. Subsequently, the soybean meal was steamed and cooled in the same manner as in Example 2. The steamed soybean meal was mixed with 1,000 kg. of roasted wheat and then treated in the same manner as in Example 2 whereby 2,500 kg. of a solid koji was obtained. This koji was mixed with 3,700 liters of a 25% (w./v.) aqueous sodium chloride solution, and the resulting moromi was fermented and aged for 6 months to obtain 4,800 liters of a soy sauce which was excellent in flavor and taste and light in color.

Analysis values of the soy sauce components were as follows: Bé. 24.0, NaCl 17.5% (w./v.), TN 1.65% (w./v.), FN 0.90% (w./v.), RS 3.81% (w./v.), Alc. 3.00% (v./v.), Col. 200, pH 4.80, nitrogen utilization ratio 85.4%.

For comparison, a control soy sauce was produced in the same manner as above, except that the calcium lactate was not added. The nitrogen utilization ratio of the control soy sauce was 82.9%.

EXAMPLE 5

In a rotary pressure steaming kettle, 120 kg. of untreated soybean was immersed in water and then drained. After 1 hour, the soybean was sprinkled with 21 kg. (0.5% by weight in terms of calcium based on said soybean) of calcium citrate [$Ca_3(C_6H_5O_7)_2 \cdot 4H_2O$], and then rotated for 30 minutes. Thereafter, the soybean was treated in the same manner as in Example 3 to obtain 455 liters of a soy sauce which was excellent in flavor and taste and light in color.

Analysis values of the soy sauce components were as follows: Bé. 22.30, NaCl 17.5% (w./v.), TN 1.66% (w./v.), FN 0.8% (w./v.), RS 2.00% (w./v.), Alc. 3.50% (v./v.), Col. 300, pH 4.75, nitrogen utilization ratio 85.7%.

For comparison, a control soy sauce was produced in the same manner as above, except that the calcium citrate was not added. The nitrogen utilization ratio of the control soy sauce was 84.2%, like that of the soy sauce obtained in Example 3.

EXAMPLE 6

100 kilograms of defatted soybean meal was sprayed with a solution of 3.3 kg. (about 0.5% by weight in terms of calcium) of calcium tartrate (special grade,

$CaC_4H_4O_6 \cdot 4H_2O$)

in 135 liters of water, and then allowed to stand for about 1 hour to uniformly absorb the solution in the soybean meal. Subsequently, the soybean meal was steamed and cooled in the same manner as in Example 2. The steamed soybean meal was mixed with 90 kg. of roasted wheat and then treated in the same manner as in Example 2 to obtain, 4 months after feeding, 500 liters of a soy sauce which was excellent in flavor and taste and light and beautiful in color. The nitrogen utilization ratio of the thus obtained soy sauce was 83.9%.

For comparison, a control soy sauce was produced in the same manner as above, except that the calcium tartrate was not added. The nitrogen utilization ratio of the control soy sauce was 82.3%.

EXAMPLE 7

In a steaming kettle, 100 kg. of untreated soybean was immersed in water overnight (for about 16 hours) and then drained. After 1 hour, the soybean was sprinkled with 6.3 kg. (1.0% by weight in terms of calcium) of calcium phosphate (special grade, $CaH_4(PO_4)_2 \cdot H_2O$), and then rotated. After allowing to stand for 1 hour, the soybean was steamed at atmospheric pressure for 30 minutes and under 1 kg./cm.$^2$ (gauge pressure of saturated steam) for 60 minutes. Thereafter, the steamed soybean was treated in the same manner as in Example 2 to obtain, 4 months after feeding, 385 liters of a soy sauce which was excellent in flavor and taste and light in color. The nitrogen utilization ratio of the thus obtained soy sauce was 85.1%.

For comparison, a control soy sauce was produced in the same manner as above, except that the calcium phosphate was not added. The nitrogen utilization ratio of the control soy sauce was 83.7%.

EXAMPLE 8

Example 6 was repeated, except that 0.5 kg. (0.1% (w./w.) in terms of calcium) of calcium succinate (special grade, $CaC_4H_4O_4 \cdot 3H_2O$), 0.3 kg. (0.05% by weight in terms of calcium) of calcium phthalate (special grade, $CaC_6H_4(COO)_2 \cdot H_2O$) and 0.6 kg. (0.1% by weight in terms of calcium) of calcium sulfate (special grade, $CaSO_4 \cdot 2H_2O$) were individually used as the calcium source in place of the calcium tartrate to obtain, 3 months after feeding, soy sauces which were excellent in flavor and taste and light in color. The yield and nitrogen utilization ratios of the thus obtained soy sauces were as summarized in Table 3.

TABLE 3

| Calcium source | Yield (liters) | Nitrogen utilization ratio (percent) |
|---|---|---|
| Calcium succinate | 495 | 84.9 |
| Calcium phthalate | 490 | 83.8 |
| Calcium sulfate | 490 | 83.7 |
| None (control) | 450 | 82.3 |

EXAMPLE 9

(A) 100 kilograms of defatted soybean was sprayed with a solution of 2 kg. (0.8% by weight in terms of calcium) of calcium carbonate in 130 liters of water, and then allowed to stand for about 1 hour. Subsequently, the defatted soybean was charged into a rotary pressure steaming kettle, steamed under 3 kg./cm.$^2$ (gauge pressure of saturated steam) for 4 minutes, and then quickly cooled to about 40° C.

(B) 100 kilograms of defatted soybean was sprayed with a solution of 1.83 kg. (0.5% by weight in terms of calcium) of calcium chloride ($CaCl_2 \cdot 2H_2O$) in 130 liters of water, and then allowed to stand for about 1 hour. Subsequently, the defatted soybean was continuously charged into a steaming kettle under a pressure of 6 kg./cm.$^2$ (gauge pressure of saturated steam), in which the defatted soybean was retained for 1 minute, and continuously discharged and then quickly cooled to about 40° C.

Starting materials subjected to steaming treatment as (A) and (B) were treated in the same manner as in Example 2, whereby soy sauces which were excellent in flavor and taste, and light and beautiful in color were obtained. For comparison, control soy sauces were produced in the same manner as above, except that the calcium salts were not added, respectively. The yield and nitrogen utilization ratios of the thus obtained soy sauces were as summarized in Table 4.

TABLE 4

| Process | Calcium source | Steam pressure | Yield (liters) | Nitrogen utilization ratio (percent) |
|---|---|---|---|---|
| (A) | $CaCO_3$ | 3 k./cm.$^2$-gauge | 536 | 88.2 |
| (A) control | None | do | 497 | 85.4 |
| (B) | $CaCl_2 \cdot 2H_2O$ | 6 kg./cm.$^2$-gauge | 572 | 93.8 |
| (B) control | None | do | 548 | 91.3 |

What is claimed is:

1. In a process for producing a soy sauce by subjecting a vegetable protein-containing material suitable for making soy sauce to steaming treatment, mixing the resultant steamed material with a carbohydrate-containing starting material, which has been roasted and crushed, inoculating and culturing a soy sauce koji mold in the resulting mixture to form a solid koji, mixing the solid koji with an aqueous sodium chloride solution, fermenting and aging the thus treated solid koji to obtain an aged moromi and then removing solids from the thus obtained aged moromi, the improvement comprising carrying out the steaming treatment in the presence of 0.05 to 1.0% by weight, based on the weight of the said protein-containing starting material of a calcium salt calculated as calcium.

2. A process according to claim 1, wherein the calcium salt is at least one member selected from the group consisting of calcium citrate, calcium tartrate, calcium lactate, calcium succinate, calcium gluconate, calcium carbonate, calcium sulfate and calcium chloride.

3. A process according to claim 2, wherein the calcium salt is calcium carbonate or calcium chloride.

4. A process according to claim 1, wherein the calcium salt is present in an amount of 0.25 to 1.0% by weight in terms of calcium.

5. A process according to claim 1, wherein the protein-containing starting material is soybean.

6. A process according to claim 1, wherein the protein-containing starting material is defatted soybean.

7. A process according to claim 1, wherein the steaming treatment is effected under a saturated steam pressure of not less than 0.8 kg./cm.$^2$ (gauge) for 80 minutes or less.

8. A process according to claim 1 wherein the vegetable protein-containing material is soybean or gluten.

9. A process according to claim 8 wherein the gluten is corn gluten or wheat gluten.

References Cited
UNITED STATES PATENTS

| | | | |
|---|---|---|---|
| 3,711,303 | 1/1973 | Luksas | 426—46 |
| 3,647,484 | 3/1972 | Yokotsuka | 426—46 |
| 3,495,991 | 2/1970 | Mogi et al. | 426—46 |

A. LOUIS MONACELL, Primary Examiner

J. M. HUNTER, Assistant Examiner